Figure 1:
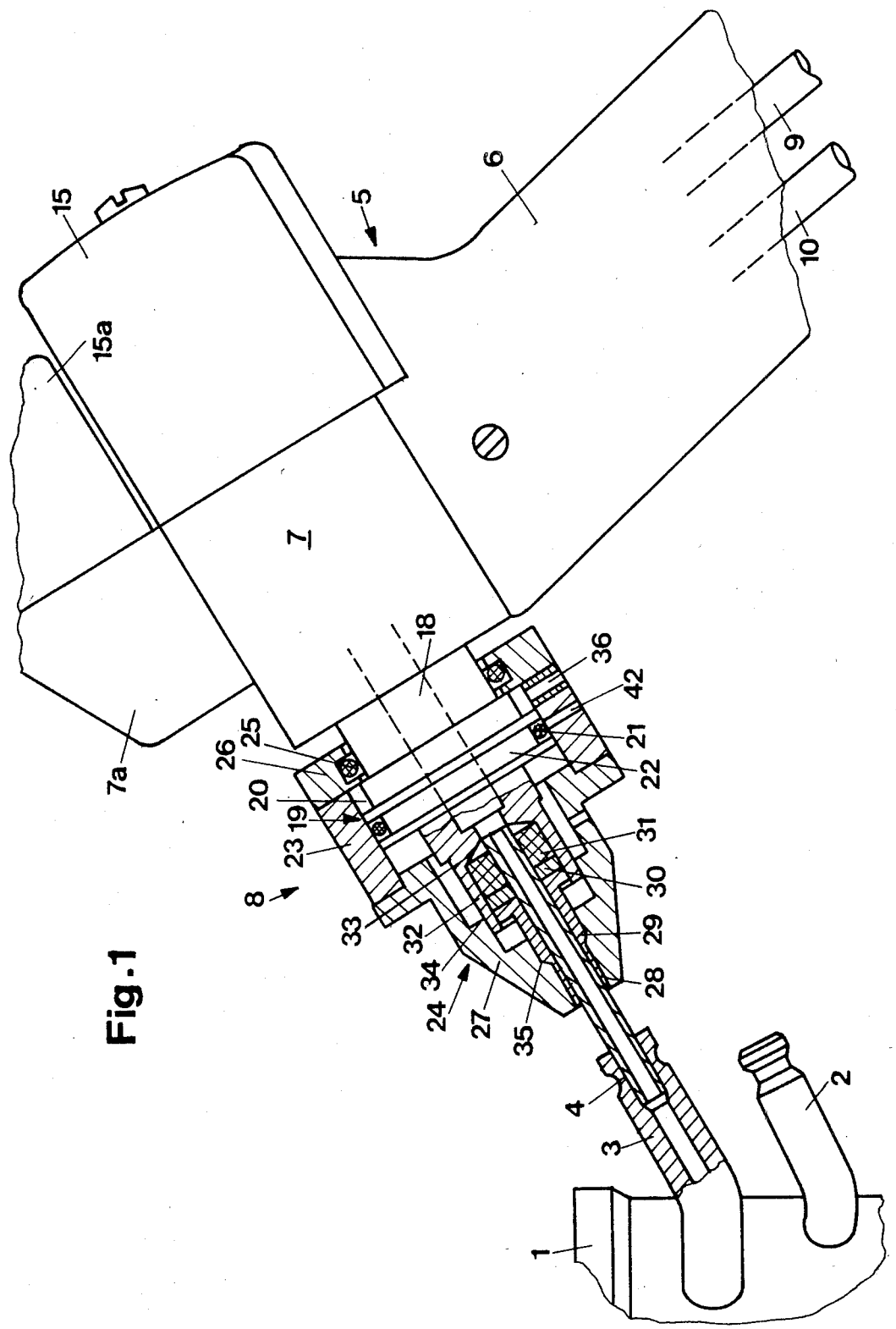

United States Patent [19]

Johansson

[11] Patent Number: 4,561,264

[45] Date of Patent: Dec. 31, 1985

[54] VALVE APPARATUS FOR EVACUATING AND/OR FILLING A REFRIGERATION SYSTEM

[75] Inventor: Gustav A. Johansson, Nordborg, Denmark

[73] Assignee: Danfoss A/S, Nordborg, Denmark

[21] Appl. No.: 661,591

[22] Filed: Oct. 17, 1984

[30] Foreign Application Priority Data

Oct. 20, 1983 [DE] Fed. Rep. of Germany ....... 3338159

[51] Int. Cl.⁴ .............................................. F25B 45/00
[52] U.S. Cl. ....................................... 62/292; 62/149; 285/101
[58] Field of Search .................. 62/292, 77, 149, 299; 285/96, 108, 101, 100; 251/148, 151, 152; 137/231, 322; 141/46, 6, 312, 39

[56] References Cited

U.S. PATENT DOCUMENTS

| | | | |
|---|---|---|---|
| 3,352,333 | 11/1967 | Glasgow et al. | 285/101 X |
| 3,935,713 | 2/1976 | Olson | 62/77 |
| 4,332,273 | 6/1982 | Boyce | 62/292 |
| 4,476,892 | 10/1984 | Boyce | 62/292 |

*Primary Examiner*—Harry B. Tanner
*Attorney, Agent, or Firm*—Wayne B. Easton

[57] ABSTRACT

The invention relates to a valve apparatus for evacuating and/or filling a refrigeration system having a hermatically closeable connecting tube. The apparatus includes a piston and cylinder unit which has a central passage for receiving such a connecting tube and is pressure operable to squeeze a sealing ring into sealing engagement with the tube to facilitate the subsequent filling or evacuating of the system through the tube via valving located in a valve block connected to the piston.

7 Claims, 2 Drawing Figures

VALVE APPARATUS FOR EVACUATING AND/OR FILLING A REFRIGERATION SYSTEM

The invention relates to a valve apparatus for evacuating and/or filling a refrigeration system having a hermetically closable connecting tube, in particular a compressor capsule, comprising a stop valve between an evacuating and/or filling conduit and a connecting head for temporary connection to the connecting tube.

Previously, a valve apparatus was used of which the connecting head forms part of a quick-make coupling. The other part of the coupling, which likewise had a valve, first had to be sealingly secured to the connecting nipple by hand. This was time consuming. Also, establishment of the seal to a large extent depended on the tolerances of the external diameter of the connecting tube. Only then was it possible to connect and release the evacuating and/or filling conduit by means of the quick-make coupling. The O-sealing rings that were employed were often worn out. After filling, the connecting tube was squeezed together with pliers and thereby hermetically closed.

With the aid of this rapid coupling, it was possible to achieve a marked reduction in the work associated with evacuation and/or filling compared with an older valve apparatus in which the housing of the stop valve was connected direct to the connecting tube. For this purpose, the connecting tube had to be provided with a peripheral bead and the valve housing had to be sealingly secured to it with the aid of a cap nut.

The invention is based on the problem of providing a valve apparatus of the aforementioned kind with which the work and time required for evacuation and/or filling can be still further reduced.

The problem is solved according to the invention in that, for direct attachment to the connecting tube, the connecting head comprises a sealing ring axially aligned with an entry in its housing and a piston-cylinder unit having a pressure chamber for a pressure medium, and that the sealing ring, which is secured against radial deflection by a circumferential wall, is disposed between two annular pressure faces and axially compressible thereby upon actuation of the piston-cylinder unit.

In this construction it is not necessary to take preparatory measures at the connecting tube before a rapid coupling can be established between the valve apparatus and the refrigeration system. Instead, it is only necessary to push the connecting head on to the connecting tube and to actuate the piston-cylinder unit by introducing pressure medium to the pressure chamber. Tolerance differences in the external diameter of the connecting tube have no detrimental effect because they are balanced out by appropriate deformation of the sealing ring which is loaded by the piston-cylinder unit. The selection of the pressure chamber pressure and the effective piston area can without difficulties be such that the required seal is ensured during evacuation, i.e. at a vacuum in the order of $10^{-3}$ bar, as well as during filling, i.e. at a pressure in the order of about 10 bar.

In a further development, the sealing ring and a coaxial clamping sleeve which is deformed radially inwardly upon axial loading may form a series circuit which can be loaded by the pressure of the piston-cylinder unit. By employing the clamping sleeve which is loaded together with the sealing ring, the sealing ring is relieved of the function of the mechanical coupling and can therefore be better designed in relation to its sealing function.

It is also favourable for the one pressure face to be connected to the piston, for the pressure face to be adjacent to the clamping sleeve, and for the connecting head housing to be provided with the cylinder and with a mouthpiece which contains the entry and a backing surface for the clamping sleeve. This results in a particularly simple and space-saving construction.

From a constructional point of view, it is also recommended that the circumferential wall surrounding the sealing ring be connected to the piston, that it should guide the clamping sleeve with the inside and that it should displaceably abut the connecting head housing with the outside. In this way, sufficient guiding is established between the piston and cylinder even if they are axially short.

In a preferred embodiment, a valve block is fixed to the piston, the connecting head housing being displaceable in relation to the valve block. This simplifies the construction. In particular, the piston may be traversed by a connecting passage which leads directly to the stop valves.

A pistol grip is particularly recommended. One can then easily control the entire valve apparatus so that the connecting head engages over the connecting tube.

Desirably, the piston-cylinder unit can be actuated pneumatically or by refrigerant vapour. Compressed air is cheap in comparison with other media and is in any case already available in most factories. Refrigerant is likewise available during filling.

With particular advantage, the cylinder is provided with an outlet aperture which is kept closed by the piston during normal operation but is connected to the pressure chamber upon excessive relative displacement between the piston and cylinder. In this way one achieves an indication in case the connecting head has not engaged or improperly engaged the connecting tube. The indication can be given by the sound of escaping pressure medium or by the fact that the desired pressure has not been built up in the pressure chamber.

In a further embodiment of the invention, if there is an evacuating conduit and a filling conduit, a stop valve is provided in the valve apparatus for each of the conduits. By changing over within the valve apparatus, the filling step can then follow directly after the evacuating step. A special valve for blocking the connecting tube is not required. In comparison with stop valves provided at the other end of the conduits, the internal volume of the conduits does not enter the dead space.

Particularly rapid operation is possible if provision is made for a pressure medium valve that can be actuated at will, a first pressure measuring apparatus for measuring the pressure in the pressure chamber, and a control apparatus which opens a stop valve when the pressure in the pressure chamber has exceeded a predetermined limiting value. In this case the sealing connection between the connecting head and the connecting tube is brought about by the operator when he has correctly positioned the connecting head. The next operating step then follows immediately thereafter.

A duplicate sequential control is obtained in that a second pressure measuring apparatus is provided to measure the evacuation pressure and that the control apparatus opens the evacuation stop valve depending on exceeding the limiting value of the pressure in the pressure chamber as well as closes the evacuation stop valve and opens the filling stop valve when the evacuation pressure has dropped below a predetermined limiting value. After bringing about the seal at will, evacuation takes place automatically and, thereafter, filling, again automatically.

Desirably, the pressure medium valve is operable by a foot switch. The operator then has his hands free to push the connecting head onto the connecting tube and, after filling, to close the connecting tube hermetically with pliers or the like.

Figure 2:
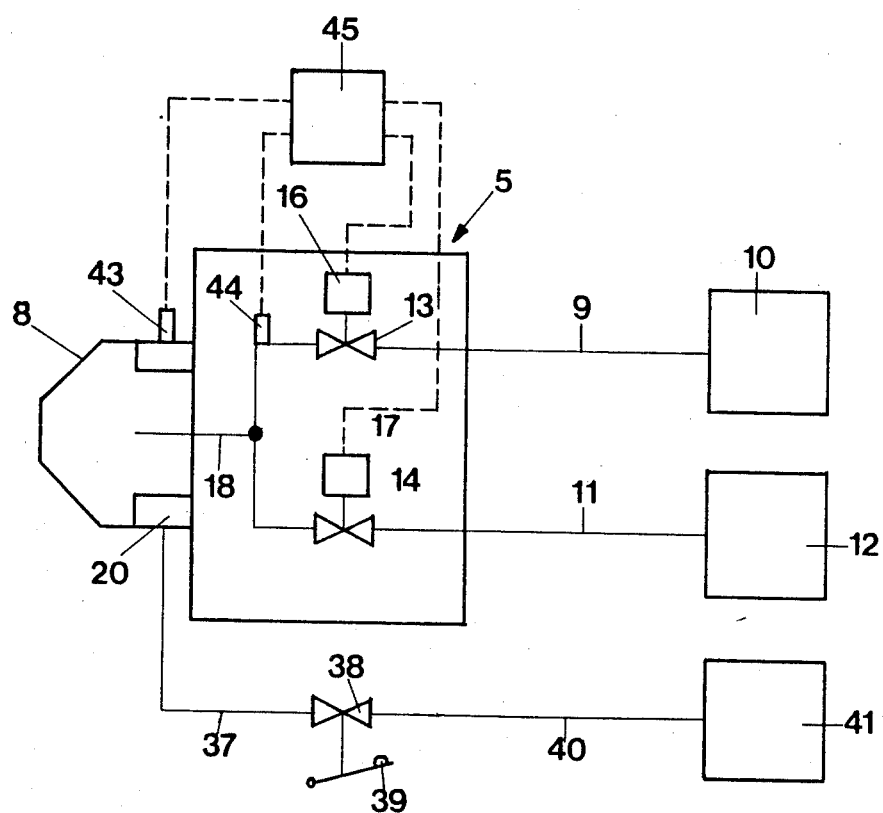

A preferred example of the invention will now be described in more detail with reference to the drawing, wherein:

FIG. 1 is a partial longitudinal section through a valve apparatus according to the invention of which the connecting head has been placed on a connecting tube; and FIG. 2 is a block diagram of the valve apparatus.

FIG. 1 shows the capsule 1 of a refrigerant compressor having an operating nipple 2 serving, for example, as a suction conduit connection, and a filling nipple 3 in which a connecting tube 4 is inserted with a seal, for example soldered in.

A valve apparatus 5 comprises a pistol grip 6, two valve blocks 7 and 7a and a connecting head 8. An evacuating conduit 9 opening into the valve apparatus communicates with an evacuating apparatus 10, for example a suction pump, and a filling conduit 11 which is connected to a filling apparatus 12, for example a refrigerant reservoir with associated dosing apparatus (FIG. 2). Within the valve apparatus 5 the conduit 9 is provided with an evacuation stop valve 13 and the conduit 11 with a filling stop valve 14. Under a cover 15 there is an actuating element 16 for the stop valve 13 and under a cover 15a an actuating element 17 for the stop valve 14, for example electromagnets. Further, in the valve apparatus 5 there is a connecting passage 18 common to both conduits 9 and 11.

The connecting head 8 comprises a piston-cylinder unit 19 with a pressure chamber 20. The unit is formed by a stepped piston 22 provided with a sealing ring 21 at the circumference and a cylinder 23. The latter is part of a connecting head housing 24 which also has a rear wall 26 provided with sealing ring 25 and a mouthpiece 27, which are interconnected by parallel screws. The mouthpiece comprises an entry 28. Coaxial thereto, there are a clamping sleeve 29, an intermediate disc 30 and an elastically deformable sealing ring 31 of a material resistant to refrigerant. The internal diameter of these parts is somewhat larger than the external diameter of the connecting tube 4. The sealing ring 31 is enclosed by a circumferential wall 32 and disposed between a first conical pressure face 33 made in one piece with the piston 22 and a second pressure face 34 formed by the intermediate disc 30. The circumferential wall 32 also guides the clamping sleeve 29 at the inside and the connecting head housing 24 at the outside. The mouthpiece carries a conical backing surface 35 for supporting the clamping sleeve 29. It can, for example, be axially slotted over part of its length, the segments being radially inwardly displaceable by means of the conical backing surface 35.

A tapped hole 36 in the cylinder 23 serves to connect a compressed air conduit 37. The latter communicates with a compressed air source 41 by way of a pressure medium valve 38 which can be actuated at will and is here operated by a foot pedal 39 and a further pressure medium conduit 40. In the cylinder 23 there is also an outlet aperture 42 which is sealed by the seal 21 of the step piston 22 in the rest condition but connects the pressure chamber 20 to atmosphere when there is relative motion between the cylinder 23 and piston 22 in excess of the normal clamping process.

The pressure in the pressure chamber 20 is measured by a first pressure measuring apparatus 43 and the pressure in the connecting conduit 18 by a second pressure measuring apparatus 44. Both pressure measuring apparatuses communicate with a control device 45. The latter control the actuating elements 16 and 17 of the stop valves 13 and 14 in the manner to be described hereinafter.

The valve apparatus operates as follows:

If the compressor capsule 1 is to be filled with refrigerant, the pistol-like valve apparatus has the connecting head 8 pushed over the connecting tube 4. The operator then actuates the foot pedal 39, whereby the connecting head housing 24 is pressed with the cylinder 23 onto the valve block 7. This axially compresses the series circuit of clamping sleeve 29 and sealing ring 31.

The clamping sleeve is clamped onto the connecting tube 4 by radially inward deformation. The sealing ring 31, which is secured against radial expansion by the circumferential wall 32, is so compressed by the two pressure faces 33 and 34, that it is deformed radial inwardly and thereby sealingly abuts the connecting tube. The displacement continues until sealing abutment of the sealing ring causes the resistance to displacement of the piston-cylinder unit 19 to become larger than the air pressure that is available.

When the pressure in the pressure chamber 20 exceeds a predetermined limiting value, which corresponds to a proper seal, this is notified to the control apparatus 45 by way of the first pressure measuring apparatus 43. The apparatus 45 then energises the actuating element 16 so that the stop valve 13 opens. Consequently, the compressor capsule 1 is vented and evacuated. As soon as the pressure in the connecting conduit 18 falls below a predetermined limiting value, which is notified to the control apparatus 45 by the second pressure measuring apparatus 44, the stop valve 13 returns to the closed position and the actuating element 17 is energised to open the stop valve 14. Liquid refrigerant now flows into the compressor capsule, a measured quantity being introduced. The stop valve 14 closes after a predetermined interval, whether by reason of quantity measurement, expiry of a time interval or a pressure rise in the connecting passage 18.

The operator now squeezes the connecting tube 4 shut with pliers in a manner such that the capsule is hermetically sealed. By releasing the foot pedal 39, the pressure in the pressure chamber 20 is lowered so that the clamping effect of the clamping sleeve 29 and the sealing effect of the sealing ring 31 are terminated. The valve apparatus 5 can then be removed from the connecting tube 4. Venting of the pressure chamber 20 can be enhanced in that the valve 38 connects the conduit 37 to atmosphere.

If the pressure medium valve 38 is actuated when the connecting head 8 has not been correctly placed on the connecting tube 4, the piston 22 will move so far that the outlet aperture 42 is freed. This results in a hissing noise which is indicative of the error. In addition, the required pressure cannot build up in the pressure chamber 20 and the sequential control of the stop valves 13 and 14 will not take place.

If corresponding stop valves are provided in the evacuation apparatus 10 and in the filling apparatus 12, it may also suffice to employ these valves for evacuation and filling and otherwise provide only one stop valve in the connecting passage 18.

I claim:

1. A valve unit for evacuating or filling a refrigeration system having a connecting tube, comprising, a connecting head member forming a cylindrical chamber and a piston slidably disposed therein, sealing means for said piston forming an expansible pressure chamber on one side thereof, said piston having wall means forming a central chamber closed at one end thereof with an abutment face, a resilient annularly shaped sealing ring disposed in said central chamber so as to be closely confined by said wall means and in abutting engagement with said abutment face, a clampling sleeve axially aligned with said sealing ring having one end thereof in abutting engagement with an interior surface of said connecting head and the other end thereof in effective abutting engagement with said sealing ring, said connecting head and said sealing ring and said sleeve forming central passage means for receiving a refrigeration system connecting tube, said connecting head having an inlet aperture having fluid communication with said expansible pressure chamber to effect movement of said piston to effect squeezing of said sealing ring between said piston and said clamping sleeve to effect a sealing engagement between said sealing ring and said connecting tube, said piston having evacuating and filling passage means having fluid communication with said central chamber for directing pressurized fluid to or evacuating fluid from said central chamber and a said connecting tube therein.

2. Apparatus according to claim 1 characterized in that said sealing ring and said clamping sleeve form a series connection through which the force of said piston effects a radially inward deformation of said sealing ring into said sealing engagement upon axial loading of said sealing ring.

3. Apparatus according to claim 1 characterized in that said connecting head member has an internal bore and said piston wall means has a cylindrical external surface slidably engaging said internal bore, and said piston wall means has a cylindrical internal wall for guiding said clamping sleeve.

4. Apparatus according to claim 1 characterized by a valve block attached to said piston, and valve means in said valve block operably connected to said filling passage means.

5. Apparatus according to claim 4 characterized by said valve block having a pistol grip formed thereon.

6. Apparatus according to claim 1 characterized in that said connecting head has an outlet aperture spaced from said inlet aperture which is kept closed by said piston during normal operation but is connected to said expansible pressure chamber upon excessive relative displacement between said piston and said connecting head.

7. Apparatus according to claim 4 characterized in that said valve block includes evacuation and filling conduits and said valve means comprising stop valves connecting said conduits to said evacuating and filling passage means.

* * * * *